United States Patent [19]

Mialon

[11] 4,292,368
[45] Sep. 29, 1981

[54] PROCESS FOR MAKING A CONNECTING ROD FOR CONTROLLING OR TRANSMITTING EFFORTS, AND CONNECTING ROD THUS OBTAINED

[75] Inventor: Jacques Mialon, Vitrolles, France

[73] Assignee: Societe Nationale Industrielle Aerospatiale, Paris, France

[21] Appl. No.: 110,662

[22] Filed: Jan. 9, 1980

[30] Foreign Application Priority Data

Jan. 15, 1979 [FR] France ................................. 79 00863

[51] Int. Cl.³ .......................... F16C 3/02; B65H 81/00
[52] U.S. Cl. .................................. 428/310; 74/579 R; 156/172; 156/194; 156/198; 264/257; 428/377; 428/398
[58] Field of Search ............... 156/194, 198, 169, 155, 156/172, 165, 191, 187, 245; 264/103, 262, 313, 258, 257; 29/515, 518; 74/579 R, 581; 64/15; 416/134 A, 230; 273/80 R, 80.6, 80.8; 428/35, 310, 376, 377, 398

[56] References Cited

U.S. PATENT DOCUMENTS

| 3,553,978 | 1/1971 | Williams ................................. 64/15 |
| 3,765,267 | 10/1973 | Bourquardez et al. ......... 416/134 A |
| 3,943,020 | 3/1976 | Ashton et al. ...................... 156/172 |

Primary Examiner—Michael W. Ball
Attorney, Agent, or Firm—Merriam, Marshall & Bicknell

[57] ABSTRACT

The present invention relates to a process for making a connecting rod for controlling or transmitting efforts, comprising a rod provided at at least one of its ends with a connecting member, wherein a tubular element is firstly made of high strength fibers impregnated with polymerizable resin, said end is then flattened so that it is obturated, after which the resin impregnating said element is polymerized, then said connecting member is arranged in the hardened, flattened part of said element. The invention is more particularly applicable to the manufacture of connecting rods for controlling and transmitting efforts, particularly for aircraft, helicopters, etc. . . .

8 Claims, 8 Drawing Figures

PROCESS FOR MAKING A CONNECTING ROD FOR CONTROLLING OR TRANSMITTING EFFORTS, AND CONNECTING ROD THUS OBTAINED

The present invention relates to a process for making a connecting rod for controlling or transmitting efforts, as well as to a connecting rod obtained by carrying out this process. It is applied more particularly, but not exclusively, to the manufacture of a control transmission rod for an aircraft, and in particular for an aerodyne.

It is known, in fact, that, for transmitting movements or orders, it is often necessary to use linkages provided with connecting rods. Similarly, certain aerodyne structures comprise, between two fixed members, a connection by connecting rods, the latter ensuring, between these two members, the transmission of traction or compression efforts in the axis of said connecting rods. These connecting rods generally comprise a tubular rod at at least one end of which a connecting member is provided, such as a fork joint, an eye, a swivel joint, a fork, etc. . . .

In known connecting rods, said connecting member is generally fast with an end piece which is connected to said tubular rod, said connecting member therefore being connected to the rod by said end piece.

These known connecting rods comprise a metal rod made of a light alloy, whilst the end pieces are made of an iron alloy. Due to the difference of the metals constituting the tubular rod and the end pieces, a substantial galvanic cell appears between the metals, this causing considerable corrosion, despite the usual interposition of mastic or an insulating varnish before the said end pieces are connected to said rod. Moreover, these known connecting rods are relatively heavy. In an attempt to remedy these drawbacks and to benefit from the excellent mechanical qualities of the laminate materials (resistant fibers of glass, carbon or the like coated with polymerised resin), it has already been proposed to use a connecting rod made of such materials. However, in all the prior known embodiments, the connection of the central part of the connecting rod made of laminate material with the connecting members at each its ends, said members generally constituted by metallic end pieces, requires an anchoring structure of one on the other by gluing, shrinking or other process of connection, leading to high manufacturing costs.

It is an object of the present invention to remedy these drawbacks. It directly concerns the manufacture of light connecting rods of low cost price, intended to be inserted in flight control chains for light aircraft or helicopters in which the forces transmitted are relatively low, but where, on the other hand, a considerable reliability is necessary, these connecting rods being for the main part made of laminate materials but not comprising added end pieces. The invention also concerns the manufacture of structural connecting rods capable of transmitting considerable axial, static or dynamic efforts in traction and/or in compression. These connecting rods, for which a considerable reliability is sought, are used for example as inner stiffeners in the wing boxes of aircraft or as elements constituting the frame for fixing the main gear box of helicopters on the top of the fuselage thereof.

To this end, according to the invention, the process for making a control connecting rod, comprising a rod provided at at least one of its ends with a connecting member, is noteworthy in that a tubular element is firstly made, composed of high strength fibers impregnated with polymerisable resin, said end is then flattened so that it is obturated, after which the resin impregnating said element is polymerised, then said connecting member is arranged in the hardened, flattened part of the element.

In this way, a connecting rod is obtained whose tubular body and ends are completely made of laminate material, the connecting members being directly fixed on said ends, without interposition of an added end piece.

The tubular element is preferably obtained by winding, on a mandrel made of a material of the deformable foam type, high strength fibers impregnated with polymerisable resin, and said mandrel remains in position inside said tubular element during the flattening of the or each end thereof and the polymerisation of the resin. The length of the mandrel is at the most equal to that of the tubular element and the ends of said mandrel possibly have a smaller diameter than the rest of said element, in order to promote the shaping of the ends of the tubular element at the moment of flattening thereof, whilst allowing a complete filling of said element.

Between one end of the mandrel and one end of the winding of fibers, a sleeve of high strength fibers impregnated with polymerisable resin is advantageously disposed, which sleeve is applied substantially against the inner wall of the end of said winding, then said end is flattened at least until the inner surface portions of said sleeve, disposed on either side of the plane of flattening, are applied against one another, substantially completely obturating the section of the flattened portion of said end by the winding and, after said flattening, the resin impregnating said sleeve and that impregnating said winding are polymerised simultaneously.

To this end, it is advantageous to provide a mandrel of which at least one end has an extension of smaller diameter coaxial to the rest of said mandrel, but separated therefrom by a shoulder. On this extension, high strength fibers impregnated with polymerisable resin may be wound to form said sleeve until the diameter thereof is substantially equal to the normal diameter of the mandrel, then, on the mandrel and on said sleeve thus made, the high strength fibers impregnated with polymerisable resin adapted to form the tubular element are wound.

The length of the sleeve of high strength fibers impregnated with polymerisable resin is advantageously chosen to be greater than the length of the extension of smaller diameter, to extend outwardly of this extension over a length substantially equal to the flattened end portion of the connecting rod. To allow complete filling of the connecting rod by the material of the mandrel, even near the flattened portion of said connecting rod, it is advantageous if the free end of the extension is tapering, for example conical.

Such a mandrel may be in one piece and may be made of a rigid, light plastic foam, such as polyurethane foam.

The invention will be more readily understood on reading the following description with reference to the accompanying drawings, in which.

Figure 6:
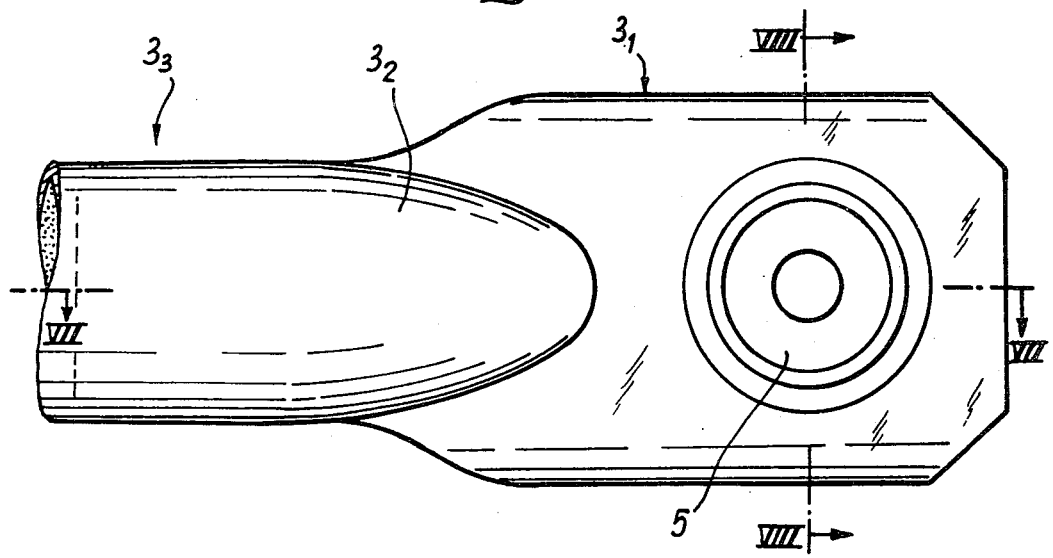
FIG. 6 is a front view of a connecting rod end obtained by carrying out the process of the invention.
Figure 7:
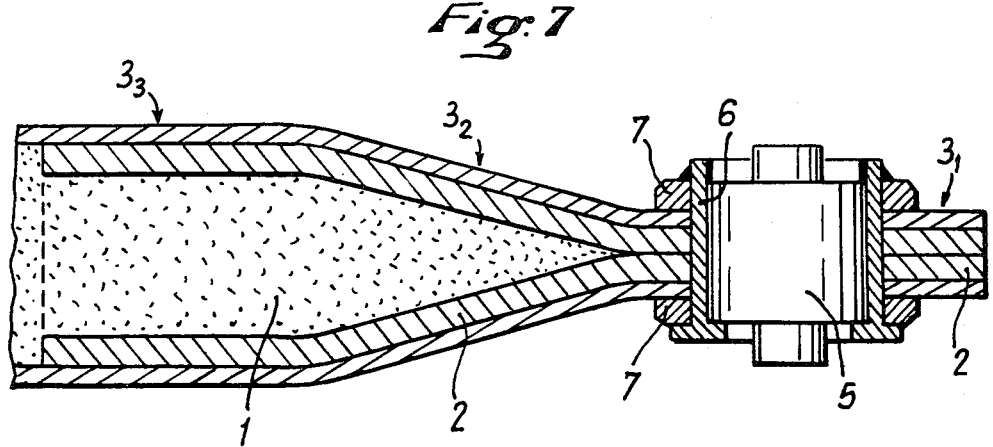
FIG. 7 is a longitudinal section along line VII—VII of FIG. 6.

Referring now to the drawings, the process according to the invention is intended to produce a connecting rod for controlling or transmitting efforts, of which one end is shown in FIGS. 6 and 7.

The connecting rod comprises an inner filling 1 of cellular plastic material which is deformable under a light effort, an end sleeve 2 made of fabric-resin laminate and a body 3 also made of fabric-resin laminate.

This fabric of resistant fibers may be fabric of glass, carbon or of "Kevlar" fibers, and the resin may be a thermosetting resin such as epoxy resin.

Figure 5:
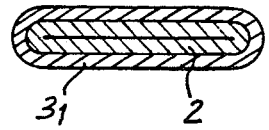
FIG. 5 is a section along line V—V of FIG. 4.
Figure 8:
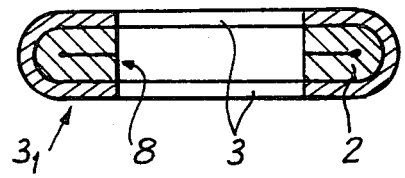
FIG. 8 is a transverse section along line VIII—VIII of FIG. 6, the connecting member being asumed not to be in position yet.

The intermediate part $3_3$ of the body 3 is of circular section, for example, the part $3_1$ of oblong section comprising two parallel sides connected at the ends by two substantially semicircular lines (cf. FIGS. 5 and 8). Parts $3_1$ and $3_3$ are connected by a portion $3_2$ of evolutive section.

The sleeve 2 extends from the flattened end $3_1$ of the connecting rod to its circular part $3_3$, where it may penetrate over a more or less considerable length. The opposite inner walls of said sleeve meet in the flattened part $3_1$. This flattened part may have a length substantially equal to half the length of said sleeve 2.

Figure 1:
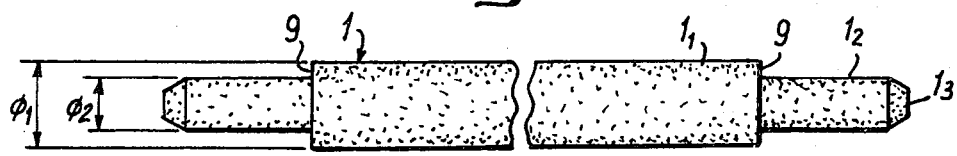
FIG. 1 shows a mandrel for making a connecting rod, according to a preferred embodiment of the invention.

FIG. 1 shows a preferred embodiment of a mandrel according to the invention, intended to serve for making a connecting rod by winding, for complete filling of the inside thereof and for easily shaping the ends of said connecting rod.

This mandrel makes it possible to make the connecting rod according to the invention simply and inexpensively, one example of said connecting rod being given in FIGS. 6 and 7. It may be injected under pressure in a mold having its outer shape or may be machined in conventional manner. This foam may for example be an injected rigid polyurethane foam.

The mandrel, which bears general reference 1, comprises an intermediate cylindrical part $1_1$, whose length corresponds to the total length of the connecting rod less the lengths of the two end sleeved parts of the connecting rod to be produced. The diameter $\phi 1$ of part $1_1$ corresponds to the inner diameter of the body of the connecting rod. The intermediate part $1_1$ comprises at its two ends two coaxial cylindrical extensions $1_2$, of smaller diameter, connected to said part by shoulders 9. At their free end, the extensions $1_2$ are respectively provided with truncated parts $1_3$.

The total length of an assembly $1_2 - 1_3$ corresponds substantially to the sleeved length of the end of the connecting rod in the evolutive part $3_2$ of the body 3 (sleeved length less flattened length). The diameter $\phi 2$ of the parts $1_2$ corresponds to the maximum diameter of the sleeved part of the connecting rod.

If the thickness of the sleeve is e, then $$e = (\phi 1 - \phi 2)/2$$

The truncated part $1_3$ has a length and an inclination adapted to the possibilities of plastic deformations of the foam used. As will be seen hereinafter, it makes it possible to obtain a filling of virtually zero thickness at the beginning of the inner flattened part of said sleeve, i.e. at the end of said filling.

Figure 2:
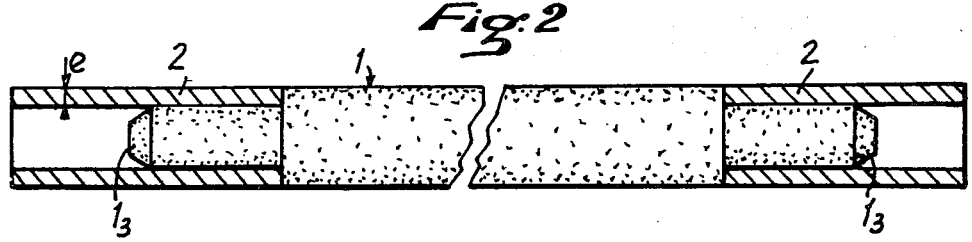
FIGS. 2, 3 and 4 illustrate different steps in the carrying out of the process of the invention, by means of the mandrel of FIG. 1.

As shown in FIG. 2, there are wound on the mandrel 1 a plurality of turns (or "folds") of the fabric preimpregnated with resin on the extensions $1_2$. Each winding 2 thus obtained is made until the diameter or the part $1_1$ is attained on the outside. Moreover, each winding 2 extends outwardly beyond the corresponding part $1_3$. These windings have a length equal to the length of said sleeve before the connecting rod is finished, and will subsequently constitute the sleeves 2.

Figure 3:
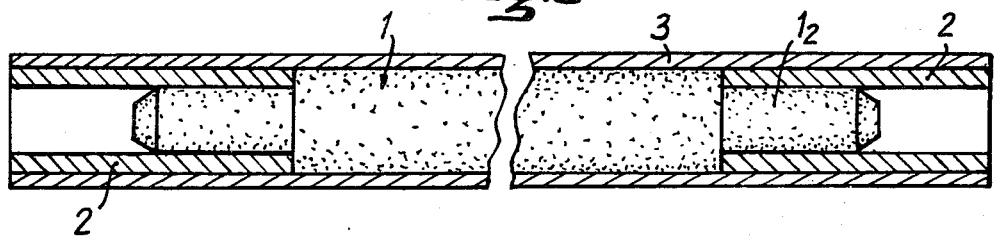

As shown in FIG. 3, an additional winding 3 is made on the mandrel 1 and on the two windings 2 of preimpregnated fabric, said additional winding covering the assembly 1-2 over its whole length.

This winding will constitute, after its ends are flattened and the resin polymerised, the body 3 of the connecting rod. Its thickness is therefore substantially equal to that of the said finished body and its length is equal to that of the connecting rod before the end pieces are finished. The number of the turns of the windings 2 and 3 is a function of the thickness of the connecting rod body and its end, which it is desired to obtain.

Figure 4:
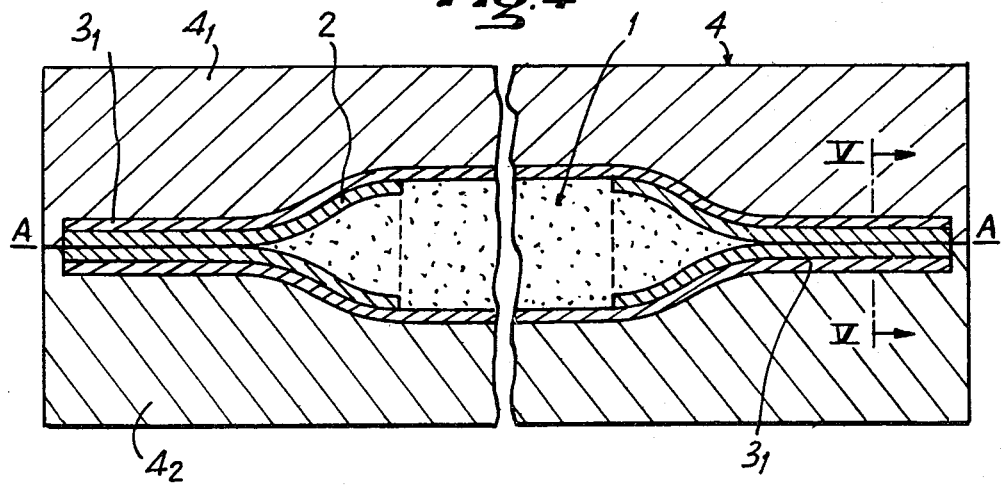

The assembly 1, 2, 3 of FIG. 3 is then disposed in a mold 4 constituted by two half-molds $4_1$ and $4_2$ of which the planes of join pass through the axis of said assembly and are merged with the plane of symmetry of the connecting rod, parallel to the two parallel sides of the oblong section of part 3 (cf. FIG. 4).

The inside of the complete mold takes the form of the connecting rod before finishing and, like said rod, comprises parts $3_3$, $3_2$ and $3_1$. Said mold is, for example, made of light alloy.

When the assembly of FIG. 3 is positioned in the mold 4, the ends are flattened and take their final form.

The mold is then taken to 120° C. for 1 hr. 30 mins. in order to polymerise the resin of the preimpregnated fabrics.

After cooling to a temperature of 40° C., the connecting rod is removed from the mold and the ends are routed to the desired length, then pierced to make an eye 8 therein, adapted to receive the swivel joint, bearing, bush or like connecting member 5, which will be crimped.

FIGS. 6, 7 and 8 show one end of the connecting rod thus finished and equipped. The end edge of the flattened parts is routed in the shape as indicated in FIG. 6 so as to obtain a determined overall length of the connecting rod.

The eye 8 is pierced and bored. Its axis is located on the longitudinal axis of the connecting rod and perpendicular to the parallel sides of the flattened end piece. The position of the transverse axis is determined so as to obtain a determined length between axes of the added connecting elements.

The connecting member 5 is then crimped, in known manner, in the eye 8 via a metal ring 6 and two washers 7, as may be seen in FIG. 7.

In view of the end piece thickness which it is possible to obtain according to the invention, i.e. the working section usable, it is possible not to use washers 7, this constituting one of the advantages of the invention.

In fact, due to the low weight and the ease of shaping the preimpregnated fabric, the sleeve 2 may have a considerable thickness (cf. FIG. 8).

The connecting rod obtained according to the invention procures a considerable saving in mass with respect to a conventional connecting rod composed of a metallic body, whilst offering a comparable strength for axial static efforts.

Moreover, said connecting rod is completely tight and does not corrode.

It does not require any surface treatment (painting, printing, etc . . . ).

When an electrical continuity must be ensured between the different elements of a control chain, it suffices to deposit on the connecting rod a thin strip of conducting paint connecting the bores 8.

What is claimed is:

1. A process for making a connecting rod provided with a connecting member on at least one of its ends, comprising the steps of:
   forming a tubular element by winding high strength fibers impregnated with polymerizable resin on a light, rigid, deformable, cylindrical solid mandrel having a length not greater than the length of said connecting rod, said mandrel having, adjacent at least one of its ends, a section of smaller diameter than the remainder thereof, said winding extending over said section;
   flattening said tube at said one end of said mandrel so that is is obturated,
   polymerizing said resin impregnating said fibers in the presence of said mandrel to form a hardened tubular element having a flattened end; and
   arranging said connecting member in said hardened, flattened end of said tubular element.

2. The process of claim 1 including, prior to flattening said tube, the additional step of disposing on said section and underlying said winding a sleeve of high strength fibers impregnated with polymerizable resin, said flattening serving to flatten both said sleeve and said tubular element; and
   said polymerizing step causing the simultaneous polymerization of the resin impregnating said sleeve and that impregnating said winding.

3. The process of claim 2 wherein said section is generally cylindrical and coaxial with the remainder of said mandrel.

4. The process of claim 3 wherein said section has a tapering free end.

5. The process of claim 3 wherein said sleeve is formed by winding high strength fibers on said section until the diameter of the sleeve is substantially equal to the diameter of the remainder of the mandrel.

6. The process of claim 5 wherein the length of said sleeve is greater than the length of said section, said sleeve and said deformable tube wound thereon extending outwardly beyond said section over a length which forms said flattened end of said connecting rod.

7. The process of claim 1 wherein said mandrel is formed of a single piece of a rigid plastic foam.

8. A connecting rod made in accordance with any of claims 1 to 7.

* * * * *